United States Patent

Hathaway

[15] 3,669,384

[45] June 13, 1972

[54] SPINDLE CONSTRUCTION FOR TAPE TRANSPORT

[72] Inventor: Richard A. Hathaway, Saratoga, Calif.

[73] Assignee: Cartridge Television, Inc., New York, N.Y.

[22] Filed: June 26, 1970

[21] Appl. No.: 50,204

[52] U.S. Cl. ..............................242/194, 242/68.3, 352/156

[51] Int. Cl. ......................................G03b 1/04, G11b 15/32

[58] Field of Search ................242/54.1, 68.3, 188, 193, 194, 242/197–200; 352/156

[56] References Cited

UNITED STATES PATENTS

| | | | |
|---|---|---|---|
| 2,614,761 | 10/1952 | Camras | 242/54.1 |
| 2,668,021 | 2/1954 | Gleason | 242/54.1 |
| 3,313,496 | 4/1967 | Northrup | 242/68.3 |
| 3,322,364 | 5/1967 | Dekker | 242/68.3 |

*Primary Examiner*—Leonard D. Christian
*Attorney*—Townsend and Townsend

[57] ABSTRACT

An improved spindle for mounting a tape reel of a tape cartridge for rotation wherein the spindle includes the shaft provided with a rotor for insertion into the hub of the tape reel. The rotor has detent means which cooperate with inner peripheral teeth on the reel hub to couple the reel to the spindle rotor for rotation about the axis of the spindle shaft. The invention is especially adapted for use with a reel-over-reel cartridge wherein a pair of co-axial spindles are adapted to be connected with the two reels of the cartridge.

44 Claims, 5 Drawing Figures

INVENTOR.
RICHARD A. HATHAWAY
BY
Townsend and Townsend

INVENTOR.
RICHARD A. HATHAWAY
BY
Townsend and Townsend

INVENTOR.
RICHARD A. HATHAWAY
BY
Townsend and Townsend

SPINDLE CONSTRUCTION FOR TAPE TRANSPORT

This invention relates to improvements in tape transport systems and, more particularly, to spindle apparatus for use with a tape cartridge in such a system.

In utilizing a tape cartridge with a tape transport system, it is essential that the reels of the cartridge be coupled with reel drive means forming a part of the tape transport so that the tape reels can be driven in particular directions, such as during a record or a playback operation or during a tape rewind operation. Thus, tape pulled off one reel of the cartridge can be moved on to another reel as the latter is driven in a desired direction.

The reel drive means generally comprises a spindle for engaging the hub of a tape reel for rotation. It is essential that the reel hub be firmly, yet releasably attached to the spindle so that there is no relative movement between the reel hub and the spindle which would possibly cause improper movement of the tape onto and off the reel. Also, the spindle must be constructed to allow the reel hub to be quickly moved onto and off the spindle as the cartridge is moved into and out of an operative position on the tape transport.

The present invention provides improvements in spindles for mounting tape reels on a tape transport. To this end, the invention is directed to a spindle comprised of a shaft having a rotor for insertion into the inner peripheral opening of a tape reel hub. The rotor has a number of detents on its outer periphery for engaging inner peripheral teeth on the reel hub and the detents are configured so that they cooperate with annular, bevelled inner peripheral surfaces on the reel hub to cause the reel to be forcibly urged onto the spindle and into a fixed position thereon after the reel has moved onto a portion of the spindle itself.

The detents are cylindrical in shape and are carried in recesses in the rotor with each recess forming an angle with the outer periphery of the rotor so that only an end portion of the corresponding detent projects outwardly from the outer periphery of the rotor. Moreover, spring means is provided to bias each detent out of the rotor yet the detent can be urged inwardly as the rotor is received within a reel hub. An end portion of the rotor retains the detent in its recess and prevents it from moving outwardly except when a cap, releasably secured to the end face of the rotor, is removed.

The spindle structure of the present invention is especially adapted for use with a reel-over-reel cartridge wherein it is desired to drive the two reels of such a cartridge at different times. To this end, the spindle structure includes a pair of concentric shafts having respective rotors thereon for insertion into corresponding tape reel hubs of a tape cartridge of the reel-over-reel type. One shaft is tubular and rotatably receives the other shaft. Also, a first of said shafts is adapted to be driven to rotate its rotor during a record or playback operation and the other shaft is adapted to be driven to rotate its rotor during a tape rewind operation. The reel hubs remain attached to the spindle rotors at all times during the record, playback or rewind operations, the rewind spindle being freely rotatable during a record or playback operation and the spindle driven during a record or playback operation being freely rotatable during a rewind operation.

The spindle construction of the invention also allows the reels to be moved quickly off the spindle rotors when it is desired to separate the cartridge from the tape transport. The spindle construction also allows the tape reel to float within the cartridge housing so as to eliminate support structure for the reels and to allow the cartridge to be of minimum width.

The primary object of the present invention is, therefore, to provide an improved spindle for mounting and rotating a tape reel on a tape transport wherein the spindle is adapted to be inserted into the hub of the tape reel and has means movable into coupled relationship with inner peripheral teeth on the reel hub so that the reel is firmly yet releasably attached to the spindle.

Another object of this invention is to provide an improved spindle for use with a tape reel of a tape cartridge wherein the spindle has a rotor mounted on a shaft with the rotor having a number of spaced detents projecting outwardly from its outer periphery, so that the detents can cooperate with inner peripheral surfaces on the tape reel hub to not only couple the reel for rotation with the spindle but to releasably hold the same against axial movement with respect to the spindle itself.

A further object of this invention is to provide spindle structure for a tape transport for mounting the reels of a reel-over-reel cartridge thereon wherein a pair of coaxial spindles cooperate with each other to mount a pair of generally axially aligned reels on the spindles in a manner such that the reels are uniformly spaced apart at all times and one of the reels can be driven while the other is freely rotatable while, at the same time, the spindles can interchangeably receive tape reels of different cartridges.

Another object of this invention is to provide an assembly including a spindle structure of the type described and a cartridge of the reel-over-reel type wherein the spindle structure has improved detent means cooperable with inner peripheral surfaces on the tape reels of the cartridge to releasably couple the reels for rotation while holding the same against axial movement with respect to the spindle structure itself.

Still another object of this invention is to provide a tape reel for use with the aforementioned spindle structure wherein the tape reel has bevelled inner peripheral surfaces which cooperate with detent means on the spindle structure to urge the tape reel forcibly onto and off the same while, at the same time, one of the surfaces is engageable with the detent means to cause the tape reel to be held in a fixed, axial position on the spindle structure for rotation therewith.

Other objects of this invention will become apparent as the following specification progresses, reference being had to the accompanying drawings for illustration of an embodiment of the invention.

Figure 2A:
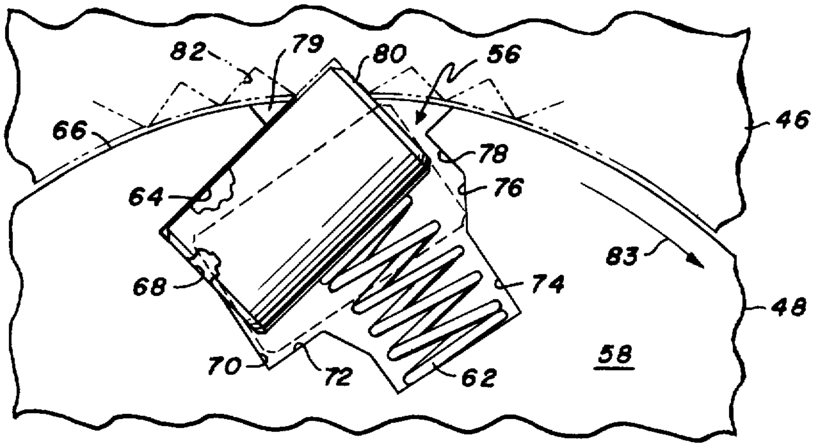
FIG. 2 is an enlarged front elevational view of the spindle construction with the spindles thereof coupled with corresponding reels of the tape cartridge.
Figure 3:
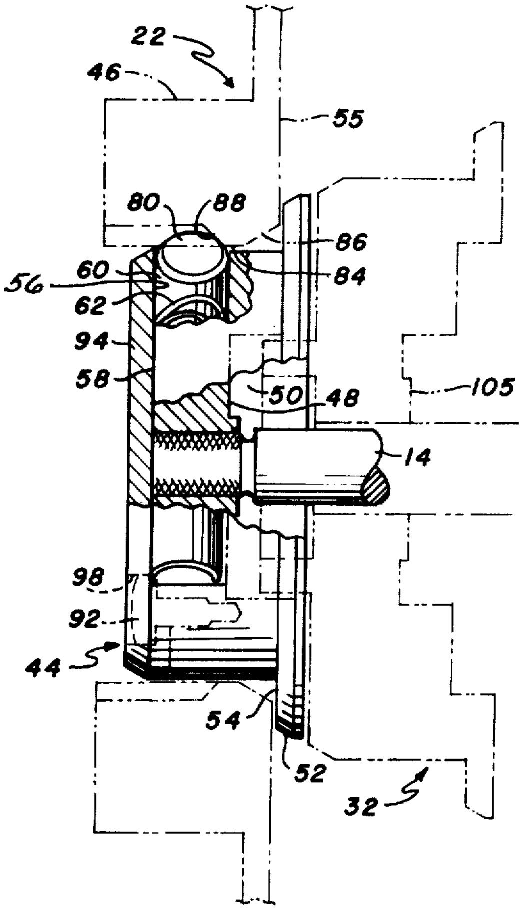
Figure 4:
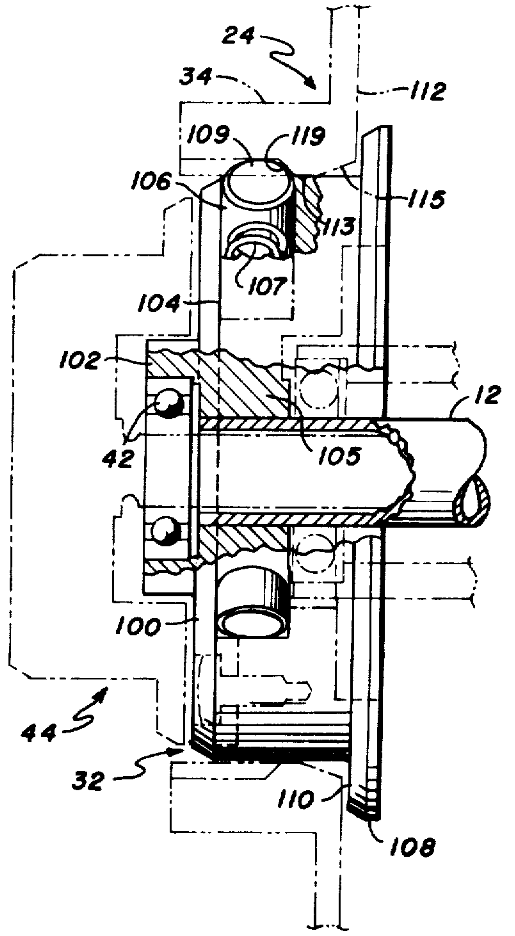

FIG. 2*a* is an enlarged, front elevational view of one of the detents of one of the spindles;

FIG. 3 is an enlarged side elevational view of the rotor and its detents for one of the spindles; and FIG. 4 is a view similar to FIG. 3 but showing the rotor and corresponding detents for the other spindle.

The spindle structure which is the subject matter of this invention is broadly denoted by the numeral 10 and will be hereinafter described with respect to rotatably mounting and driving the supply and take-up reels 22 and 24 of a reel-over-reel tape cartridge 20. To this end, spindle structure 10 includes a pair of generally concentric shafts 12 and 14, shaft 12 being tubular to receive shaft 14 and to allow the latter to rotate therewithin. The shafts extend through an opening 16 in the base plate 18 of a tape transport of the type which utilizes a rotatable head assembly for scanning a flexible, magnetic tape.

For purposes of illustration, shaft 12 is rotatably mounted within an arbor 25 by a pair of spaced bearings 26 and 28 therewithin. The arbor extends through opening 16 and has a flange 27 intermediate its ends (FIG. 1), the flange being secured by screws 29 to a shift plate 31 which is pivotally mounted by a pin 33 on base plate 18, whereby arbor 25 can be swung between a pair of operative positions. In this way, spindle structure 10 can be accomodated for cartridges of two different sizes, since the carriage mechanism which presents the cartridge reels to spindle structure will mount the hubs of the reels at a height depending upon the size of the cartridge. In the alternative, spindle structure 10 can be adapted to accomodate only a cartridge of a particular size, in which case arbor 25 can be connected directly to base plate 18. If shift plate 31 is used, it is guided by a pin 35 extending through an arcuate slot 37 in base plate 18. Any suitable means can be provided to rotate plate 31 into a desired operative position.

A rotor 32 is mounted on one end of shaft 12 for rotation therewith. The rotor is adapted to be inserted within the hub 34 of take-up reel 24 in tape cartridge 20. The cartridge has an opening 36 therethrough in the adjacent wall 38 for receiving rotor 32 when the cartridge is moved by a carriage mechanism (not shown) towards base plate 18 and onto spindle structure 10.

Shaft 14 is rotatably mounted adjacent to one end thereof on a first bearing 40 carried by a second arbor 41 concentric to and rigid with a wheel 43 having a drive disc 45 secured thereto, such as by attachment screws 47. A set screw 49 secures arbor 41 and thereby wheel 43 to shaft 12 for rotation therewith.

A second bearing 42 carried by rotor 32 at the axial center thereof rotatably mounts the opposite end of shaft 14; thus, this shaft is mounted for rotation with respect to and within shaft 12. The end of shaft 14 adjacent to bearing 42 is rigidly secured to a second rotor 44 which has essentially the same construction as rotor 32 but is smaller in diameter than rotor 32, rotor 44 adapted to be received within the hub 46 of tape reel 22 as cartridge 20 is moved toward base plate 18 and as rotor 32 is received within reel hub 34.

To illustrate the construction of each of the rotors 32 and 44, reference is first had to rotor 44 wherein it includes a body 48 (FIG. 3) which has a central recess 50 in one face thereof and provided with an annular flange 52 thereon, the flange having a generally flat face 54 for engaging the corresponding flat end face 55 on reel hub 46. Body 48 has a number of recesses 56 in the opposite face 58 thereof. Each recess 56 is adapted to receive a cylindrical detent 60 and a coil spring 62 in the manner shown in FIG. 2*a*. Each recess 56 is defined by a number of relatively angularly disposed surfaces of body 48 including the following: surface 64 which extends inwardly from the circular outer periphery 66 thereof at an acute angle, a second surface 68 extending transversely of surface 64 toward the center of body 48, a third surface 70 which extends at a small angle from surface 68 in a direction away from detent 60, a fourth surface 72 extending at an angle to surface 70 toward the adjacent spring 62, a generally U-shaped inner surface 74 defining a space for a receiving spring 62, an inclined surface 76 extending away from surface 74 toward outer periphery 66, and a surface 78 which extends along a portion of the proximal end face of detent 60, and retains the latter against axial movement out of recess 56. Thus, the foregoing surfaces present two recess portions, namely the portion for detent 60 and defined by surfaces 64, 68, 70, 72, 76 and 78, and a second portion for spring 62 defined by surface 74.

Surfaces 64 and 78 terminate at an opening 79 through which an end portion 80 of detent 60 projects so as to extend beyond outer periphery 66 of rotor 44. End portion 80 is biased outwardly through opening 79 by spring 62 which is normally under compression and bears against the side of detent 60. End portion 80 is adapted to be removably received between a pair of adjacent teeth 82 on the inner periphery of the hub of the corresponding tape reel. The outer end face of detent 60 is in face-to-face engagement with the corresponding side face of a tooth 82. In this way, the rotor on the spindle is coupled with the reel to cause rotation of the latter in the direction of arrow 83 (FIG. 2a) when the rotor on the spindle rotates under the influence of its shaft. Rotation of rotor 44 in the opposite direction could allow the rotor to rotate relative to the reel hub since a ratchet action would then occur inasmuch as the side of the detent successively engages the adjacent teeth 82.

Recess 56 is large enough to allow detent 60 to move inwardly of opening 79 so that end portion 80 is disposed within outer periphery 66. To this end, the inner face of the detent normally engages surface 68 and can rock about an axis at the junction of surfaces 68 and 70 (FIG. 2*a*). Thus, the detent can be moved to the dashed line position of FIG. 2*a* when a force is exerted on the detent such as by an annular boss 84 (FIG. 3) on the inner periphery of the reel hub adjacent to one end thereof, boss 84 having a pair of relatively convergent, bevelled annular side surfaces 86 and 88 with surface 88 having a bevel angle greater than that of surface 86. Boss 84 forces detents 60 inwardly of recesses 56 when rotor 44 is received within hub 46.

The other recesses 56 of each rotor are configured in the same way as that shown in FIG. 2*a*. For purposes of illustration, there are three such recesses in each of the spindle rotors and the recesses are symmetrically located with respect to the central axis of rotor 44.

Body 48 has a number of threaded holes therein for receiving screws 92 which releasably secure a cap 94 to the proximal end face 58 of body 48. Cap 94 serves to retain detents 60 and springs 62 in respective recesses 56 and has a number of spaced bosses on its inner face which are received within countersunk recesses 98 surrounding respective threaded holes 90 to locate the cap properly on the end of the rotor. Detents 60 are thus movable between cap 94 and the adjacent inner surface of body 48 defining the innermost extremities of the corresponding recesses 56.

Rotor 32 has the same detent and spring construction as rotor 44 illustrated in FIG. 2a. Also the detents of rotor 32 are oriented in the same direction as detents 60 of rotor 44. The cap construction for rotor 32 is slightly different from that for rotor 44 in that rotor 32 has an annular cap 100 (FIG. 1) and a tubular extension 102 and on the proximal end face 104 of rotor 32. Cap 100 retains a number of detents 106 in recesses which are substantially identical in size and configuration with each recess 56, detents 106 being substantially identical in size and configuration as each detent 60. A spring 107 yieldably biases each detent 106 in the same manner as that shown in FIG. 2*a* so that an outer end portion 109 on each detent 106 will be urged outwardly of the outer periphery of rotor 32 through an adjacent opening 111 (FIG. 2) communicating with the corresponding detent receiving recesses in rotor 32.

Rotor 32 has a body 105 (FIG. 1) which has essentially the same configuration as body 48 except on a larger scale. Body 105 has a flange 108 provided with a flat face 110 against which a corresponding flat face 112 of reel hub 34 abuts when cartridge 20 is in the operative position thereof on spindle structure 10 as shown in FIG. 1.

Hub 34 of tape reel 24 has an inner peripheral configuration substantially the same as that on hub 46 except on a larger scale. To this end, hub 34 has an annular boss 113 (FIG. 4) at one end of hub 34, a pair of relatively convergent, bevelled, annular surfaces 115 and 119 on opposed sides of boss 113, and a number of inner peripheral teeth 121 (FIG. 2) to which end portions 109 of detents 106 are to be operably coupled. Surface 119 has a bevel angle greater than that of surface 115.

Each detent 106 has an outer end face which abuts the corresponding side face of a tooth 121 in the same manner as that shown in the case of detent 60 in FIG. 2*a*. Thus, the reel hub is coupled with rotor 32 for rotation thereby in a clockwise sense when viewing FIG.1. Detents 106 are movable inwardly of their corresponding recesses against the bias force of springs 107 when the detents engage boss 113 as rotor 32 is received within hub 34.

Figure 1:
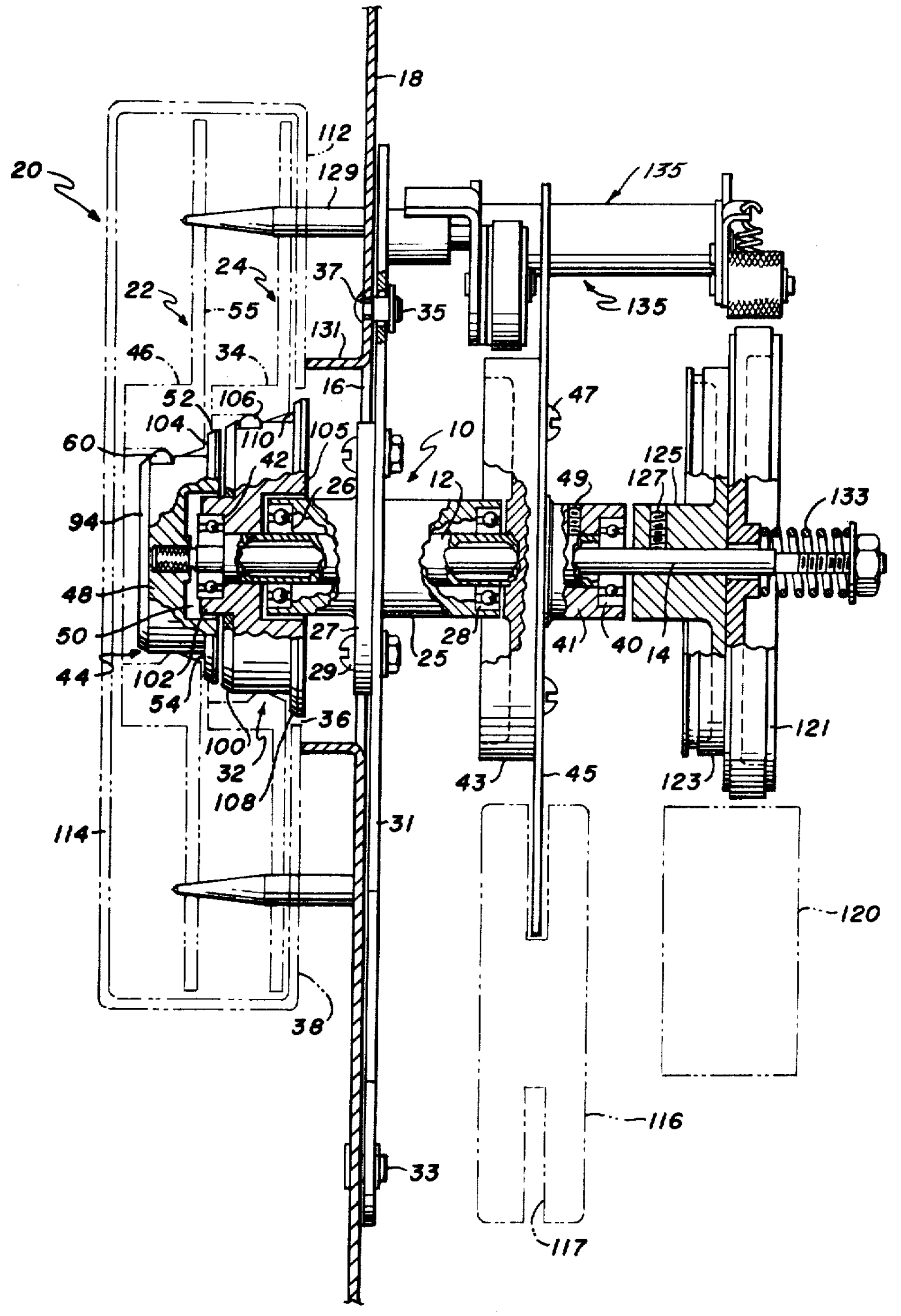
FIG. 1 is a top plan view, partly broken away and in section, of the spindle construction of the present invention showing the way in which the spindles of the invention are mounted so that they can be coupled to the reels of a reel-over-reel tape cartridge.

Reels 22 and 24 are floatingly mounted within the housing 114 of cartridge 20 (FIG. 1). A flexible magnetic tape (not shown) is adapted to be coupled with reel hubs 34 and 46 and the tape extends between the reels to present a tape stretch which can be pulled outwardly from the cartridge in a direction substantially perpendicular to the common axis of rotation of the reels, i.e. the common axis of spindle shafts 12 and 14. The tape is then moved into a position extending along a portion of the arcuate path of travel of a number of rotary heads forming parts of a rotary head assembly on the tape transport. During a record or playback operation, take-up reel 24 is driven in a clockwise direction when viewing FIG. 2 by rotating shaft 12 in any suitable manner, such as by an eddy current motor 116 (FIG. 1) having an annular groove 117 in its outer periphery which receives disk 45. Motor 116 is activated during a record or playback operation to cause rotation of take-up reel 24. For a fast-forward operation of the tape, motor 116 is urged by a linkage (not shown) toward and into engagement with the outer periphery of disk 45 to rotate the same at a relatively high speed. During a record or playback operation shaft 14 is generally free-wheeling, so that tape is freely removed from supply reel 22 as the latter rotates with shaft 14 in a counterclockwise sense when viewing FIG. 1. In the alternative, a drag force could be placed upon shaft 14 such as by a conventional drag line attached in the annular groove of a wheel 123 secured to shaft 14 (FIG. 1).

During a rewind operation, shaft 12 is not driven but shaft 14 is driven such as by a motor 120 which is movable into coupled relationship with a clutch member 121 rotatably mounted on shaft 14 but having a flat end face which is urged into frictional engagement with the adjacent end face of wheel 123 whose hub 125 is secured by a set screw 127 to shaft 14. Thus, when motor 120 is energized, shaft 14 will rotate in a clockwise sense when viewing FIG. 2 to cause tape to be wound onto supply reel 22. Take-up reel 24 will freely rotate in a counterclockwise sense during a rewind operation. A spring 133 urges clutch member into engagement with wheel 123. Also, a brake unit 135 can be employed to stop the rotations of wheel 43 and clutch member 121 at the proper times.

In the operation of spindle structure 10, shafts 12 and 14 and respective rotors 32 and 44 are mounted on base plate 18 for rotation in the manner shown in FIG. 1 wherein the shafts are carried by shift plate 31 and extend through opening 16 in the base plate. Assuming that plate 31 has initially been disposed at the desired operative position with respect to the base plate, a tape cartridge having reels 22 and 24 therein is moved in any suitable manner, such as by a carriage mechanism, toward base plate 18 until rotors 32 and 44 are received through the central opening 36 in wall 38 of the cartridge. A pair of spaced guide pins 129 carried by and extending outwardly from the base plate are received within corresponding holes in wall 38 of cartridge 20 to guide the latter toward spindle structure 10. Pins 129 are tapered at their outer ends to facilitate this purpose. Further progress of the cartridge toward base plate 18 causes rotor 44 to enter hub 46 as rotor 32 enters hub 34 until a pair of extensions 131 (FIG. 1) on base plate 18 engage cartridge wall 38.

As each rotor of spindle structure 10 passes the inner peripheral boss on the corresponding reel hub, the boss forces the detents inwardly againt the bias forces of respective springs. Detents 60 are cammed inwardly by surface 86 of boss 84 (FIG. 3) and detents 106 are cammed inwardly by surface 115 of boss 113 (FIG. 4). As soon as end portions 80 of detents 60 pass boss 84 they then engage surface 88 which has a relatively steep bevel angle. This action causes the reel hub to be literally pulled toward and into engagement with rotor flange 52 since detents 60 are allowed to emerge quickly from the rotor under the influence of springs 62 thereof. Thus, end portions 80 of detents 60 slide along surface 88 and into the spaces between adjacent pairs of teeth 82. Detents 60, therefore, releasably hold reel 22 in a fixed position on rotor 44 so that the reel cannot move axially away from the flange of the rotor and cannot rotate relative to shaft 14.

End portions 109 of detents 106 pass boss 113 as end portions 80 of detents 60 pass boss 84. Thus, end portions 109 engage surface 119 having the relatively steep bevel angle and cause reel hub 34 to be literally forced onto rotor 32 as detents 106 quickly emerge from rotor 32. Thus, both reels are thereby simultaneously coupled to respective rotors 32 and 44 and the reels are truly coaxial with each other by virtue of the coaxial nature of rotors 32 and 44.

During a record or playback operation, shaft 12 is rotated in a clockwise sense when viewing FIG. 1 by energizing motor 116, whereby tape is unwound from reel 22 and wound on reel 24 since shaft 14 is not driven but is freely rotatable. Following a record or playback operation, motor 116 is de-energized and a rewind operation can then commence.

Figure 2:
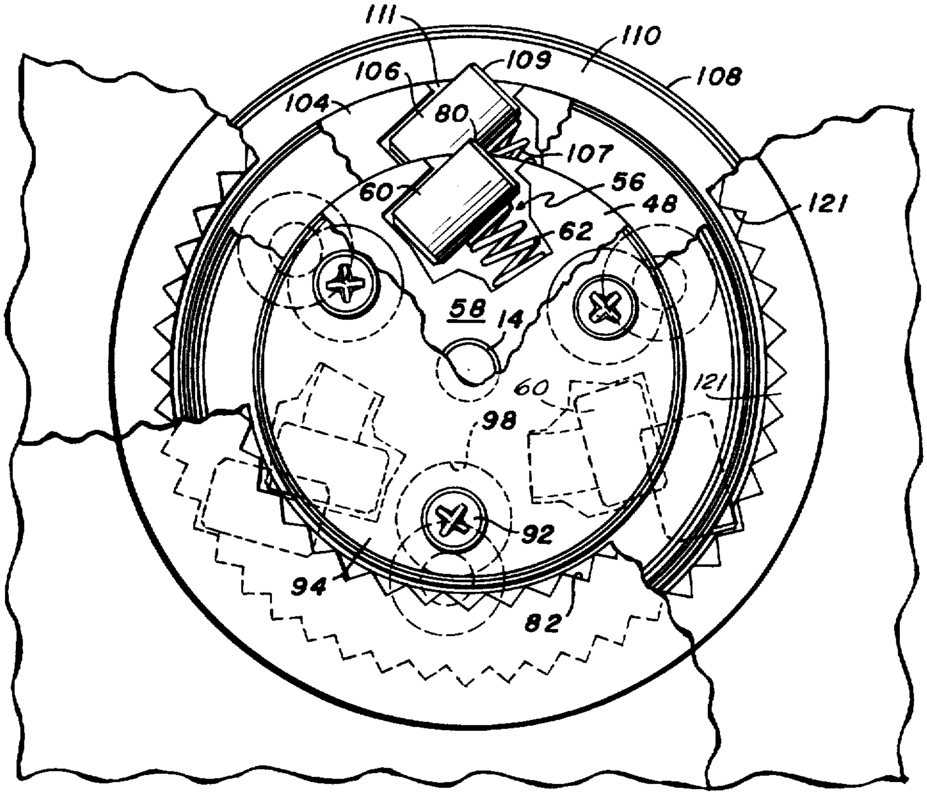

Tape is rewound on reel 22 by energizing motor 120 to cause rotation of shaft 14 in a clockwise direction when viewing FIG. 2. During the rewind operation, shaft 12 is not driven and is freely rotatable so that tape can be freely removed from take-up reel 24 and wrapped onto supply reel 22.

When it is desired to remove the cartridge from an operative position on spindle structure 10, the cartridge is forced away from base plate 18 whereupon bosses 8 and 113 on reel hubs 46 and 34, respectively, urge the detents of rotors 32 and 44 inwardly of the rotor outer periphery until the bosses clear the regions of the detents. The detents are then free to be urged outwardly by their corresponding springs and the detents return to their normal positions shown in FIG. 2.

A tape rewind operation is possible with the tape cartridge described above due to the presence of teeth 82 on the inner periphery of reel 22. However, it may be desired to prevent a rewind operation except by special equipment independently of spindle structure 10. For instance, it may be desirable to rent a tape cartridge having a particular program recorded on the tape thereof, the rental being only for a single playback operation. To assure that the tape can only be played back once, it is essential that the tape cannot be rewound in the cartridge except by the aforesaid special equipment which generally will not be available to the lessee of the cartridge.

As an optional embodiment therefore, reel 22 is not provided with inner peripheral teeth. Instead, its inner periphery adjacent to bevelled surface 88 has a smooth, cylindrical inner peripheral surface whereby detents 60 in spindle 44 cannot drivingly engage tape reel 22 to rotate the latter when rotor 44 and its shaft 14 are in a rewind mode. Thus, rotor 44 will merely rotate within and relative to tape reel 22 in such a mode and tape will remain on take-up reel 24 instead of being wound onto reel 22.

Subject matter disclosed,but not claimed herein, is claimed in various ones of the following copending United States patent applications, assigned to the same assignee as the present application and filed on the same day, June 26, 1970: as to the apparatus generally, including the bucket, patent application Ser. No. 50,059, Richard A. Hathaway, entitled "-Tape Transport Apparatus"; as to the shiftable take pick-up elements, patent application Ser. No. 50,245, William W. Swain and Richard A. Hathaway, entitled "Drive for Tape Guides of Tape Transport"; as to the cartridge, patent application Ser. No. 50,125, William W. Swain, "Tape Cartridge"; as to the shift plate, patent application Ser. No. 50,244, William W. Swain, "Shiftable Spindle for Tape Transport."

I claim:

1. A spindle for mounting a tape reel having an inner periphery provided with a number of teeth and an annular boss adjacent to the teeth comprising: a shaft, a rotor mounted on one end of the shaft for rotation therewith, said rotor having a cylindrical outer surface and an end face having a number of recesses formed therein with each recess having an opening at said outer surface; a detent for each recess, respectively, each detent being shiftably disposed within the corresponding recess and having an outer end portion normally extending through the corresponding opening and projecting outwardly therefrom beyond said outer surface of the rotor, whereby the outer end portions of said detents can be disposed between respective pairs of inner peripheral teeth on the tape reel to couple the latter with the rotor for rotation therewith; a spring within each recess, respectively, each spring being operable to bias the adjacent detent in a direction to cause its end portion to be urged out of the recess, said detents being movable inwardly of the corresponding recesses when said end portions engage said inner peripheral boss on the tape reel and as the rotor is inserted into the tape reel, whereby the end portions of the detents can move between respective teeth pairs after passing said boss and thereby releasably couple the tape reel to the rotor to hold the tape reel against axial movement with respect to the rotor.

2. A spindle as set forth in claim 1, wherein each detent is cylindrical and has a flat outer end face, each detent being disposed in the corresponding recess with its longitudinal axis in a plane generally parallel with the plane of rotation of the rotor and with said axis making an acute angle with said outer surface of the rotor.

3. A spindle as set forth in claim 1, wherein each recess extends inwardly from said rotor outer surface at an acute angle with respect thereto with each recess having a width greater than the width of the detent, each detent having a flat inner end face engageable with the rotor at the inner end of the corresponding recess an being rockable inwardly of the outer surface about said inner end of the recess when the detent engages said boss and is forced inwardly thereby, said rotor having a surface forming one boundary of each recess, respectively, with said surface being disposed for engaging the opposite end face of the corresponding detent when its end portion projects outwardly beyond said outer surface of the rotor to thereby block the detent against axial movement out of its recess.

4. In combination: a spindle having a rotatable shaft and a rotor secured to the shaft for rotation therewith, said rotor having a cylindrical outer surface and provided with detent means shiftably mounted thereon adjacent to the outer surface and biased in a direction to present a number of detent portions normally projecting laterally from said rotor outer surface; a tape reel having a hub provided with an inner periphery, said hub having a number of inner peripheral teeth adjacent to one end thereof and an inner peripheral boss defining a pair of relatively convergent surfaces adjacent to the opposite end thereof, the rotor being adapted for insertion into the hub and movable to a position with said detent portions being disposed between respective pairs of teeth, the detent means being engageable with one of said hub surfaces to urge the detent portions inwardly of said rotor outer surface to permit clearance of said boss when the rotor is inserted within the hub, said detent portions being engageable with the other hub surface after said detent portions have cleared said boss and as the rotor continues to be inserted into the hub to thereby cause said detent portions to be moved between respective pairs of teeth.

5. The combination as set forth in claim 4, wherein said rotor has a flange thereon, said hub having an end face adjacent to said opposite end thereof, said end face being movable into engagement with said flange as said detent portions move between respective pairs of teeth.

6. The combination as set forth in claim 4, wherein said hub surfaces are bevelled, the bevel angle of said one hub surface being less than that of said other hub surface.

7. The combination as set forth in claim 4, wherein the rotor has an end face provided with a number of spaced recesses therein, each recess having an opening at said rotor outer surface, said detent means including a detent for each recess, respectively, each detent having an outer end portion defining a respective detent portion and a spring for biasing each detent, respectively, in a direction to force the outer end portion thereof out of and beyond said rotor outer surface.

8. The combination as set forth in claim 7, wherein each detent is cylindrical and has a longitudinal axis normally forming an acute angle with the rotor outer surface.

9. The combination as set forth in claim 4, wherein said detent means includes a number of spaced detents, each detent having a generally flat outer end face, each tooth on the hub being defined by a pair of convergent side surfaces, said outer end face of each detent being in substantially face-to-face relationship with one of the side surfaces of an adjacent tooth when the hub is mounted on the spindle rotor and when the outer end portion of the detent projects beyond said rotor outer surface.

10. In combination: a spindle structure including a pair of rotatable shafts, one of the shafts being tubular, the other shaft being concentric to and received within said one shaft; a rotor for each shaft respectively, each rotor having a cylindrical outer periphery and being secured to the respective shaft for rotation therewith, each rotor being provided with detent means adjacent to said outer periphery thereof with the detent means of each rotor having spaced portions yieldably extending outwardly from the rotor beyond said outer periphery thereof; and a tape cartridge having a pair of generally axially aligned tape reels therewithin, there being a tape reel for each rotor, respectively, each tape reel having a central opening therein to define an inner periphery therefor, the inner periphery of one of the reels having a transverse dimension larger than that of the other reel, each reel having an annular boss on its inner periphery, each boss having a pair of relatively convergent inner surfaces extending into the corresponding central opening, said cartridge having a wall provided with a hole therethrough, the hole being aligned with the central openings of the tape reels to permit insertion of the rotors into respective tape reels, the detent portion of each reel being engageable with one of the inner surfaces of the boss of a respective tape reel to cause said detent portions to be forced inwardly of the corresponding rotor outer periphery as the rotor is partially received within the respective tape reel, whereby the detent portions will be caused to clear the boss, the other inner surface of each boss being disposed to permit the corresponding detent portions to move outwardly of the outer periphery of the respective rotor as the latter continues to be received within the corresponding tape reel and after the detent portions have cleared the corresponding boss, whereby each rotor can be fully received within the corresponding tape reel.

11. The combination as set forth in claim 10, wherein each rotor has a flange, each tape reel having an end face movable into engagement with the flange of the corresponding rotor when the latter is fully received within its tape reel.

12. The combination as set forth in claim 10, wherein each rotor has an end face provided with a number of recesses therein, each recess having an opening at the outer periphery of the corresponding rotor, said detent means including a detent for each recess respectively, and a spring within the recess for biasing the detent in a direction to cause an outer end portion of the detent to project outwardly from the rotor through the adjacent opening and beyond the outer periphery of the rotor.

13. The combination as set forth in claim 10, wherein the inner surfaces of each boss are bevelled, the bevel angle of said one inner surface of each boss being less than that of said other inner surface thereof.

14. The combination as set forth in claim 10, wherein each tape reel has a number of spaced teeth on its inner periphery, the teeth being adjacent to said other inner surface of the corresponding boss, said detent portions of each rotor being movable between adjacent pairs of teeth of the respective tape reel as the rotor moves into the position in which it is fully received within the tape reel.

15. The combination as set forth in claim 10, wherein a first of said tape reels has a number of spaced teeth on its inner periphery, the teeth being adjacent to said other inner surface of the corresponding boss, said detent portions of the corresponding rotor being movable between adjacent pairs of teeth of the respective tape reel as the rotor moves into the position in which it is fully received within said one tape reel, the second tape reel having means on said inner periphery for maintaining the corresponding rotor out of driving relationship to the other tape reel when the rotor is fully received therein, whereby the rotor can rotate in either direction relative to said second tape reel.

16. The combination as set forth in claim 15, wherein said second tape reel has a cylindrical surface on said inner periphery adjacent to said other inner surface of the corresponding boss, said detent portions of the corresponding rotor being out of coupled relationship to said cylindrical surface when the rotor is fully received within the second tape reel, said cylindrical surface defining said maintaining means.

17. The combination as set forth in claim 15, wherein said first tape reel is between the second tape reel and said cartridge wall.

18. In a tape cartridge: a tape reel having a central opening defining an inner periphery therefor, said tape reel adapted to be mounted on a rotatable spindle with the spindle being receivable within said central opening, said reel having means defining a pair of relatively convergent inner surfaces extending into said opening with the surfaces being disposed to cooperate with shiftable detent means carried by the spindle to releasably couple the tape reel thereto.

19. In a tape cartridge the combination as set forth in claim 18, wherein said defining means includes an annular boss, said inner surfaces forming the opposed sides of the boss.

20. In a tape cartridge the combination as set forth in claim 18, wherein is provided a number of spaced teeth on said inner periphery of the reel, the teeth being adjacent to one of said inner surfaces.

21. In a tape cartridge the combination as set forth in claim 18, wherein said tape reel has a cylindrical surface on said inner periphery adjacent to one of said inner surfaces.

22. In a tape cartridge the combination as set forth in claim 20, wherein each tooth is defined by a pair of relatively convergent side faces extending axially of said tape reel away from said one inner surface.

23. A tape cartridge comprising: a housing having a pair of generally axially aligned tape reels therein, each tape reel having a central opening defining an inner periphery therefor, the housing having a wall provided with a hole therethrough with the hole being generally aligned with the central openings of said tape reels, one of the tape reels being between said wall and the other reel, the central opening of said one tape reel having a transverse dimension greater than that of the other tape reel; and means on the inner periphery of each tape reel, respectively, for defining a pair of relatively convergent inner peripheral surfaces extending into the corresponding opening.

24. A tape cartridge as set forth in claim 23, wherein said defining means includes an annular boss for each tape reel, respectively.

25. A tape cartridge as set forth in claim 23, wherein each tape reel has a hub provided with a pair of opposed ends, said defining means including an annular boss for each hub, respectively, the boss being mounted on the hub adjacent to the end thereof nearest to said housing wall.

26. A tape cartridge as set forth in claim 23, wherein each tape reel has a number of spaced teeth on the inner periphery thereof adjacent to one of said inner peripheral surfaces thereof.

27. A tape cartridge as set forth in claim 26, wherein each tape reel has a pair of opposed ends, said defining means including an annular boss mounted on each tape reel, respectively, adjacent to the end thereof nearest to said housing wall, said teeth on each tape reel being between the corresponding boss and the opposite end of the tape reel.

28. A tape cartridge as set forth in claim 23, wherein a first of said tape reels has a number of spaced teeth on the inner periphery thereof adjacent to one of said inner peripheral surfaces thereof, the second tape reel having a cylindrical surface on the corresponding inner periphery adjacent to one of said inner peripheral surfaces thereof.

29. A tape cartridge as set forth in claim 28, wherein said first tape reel is between the second tape reel and said housing wall.

30. A tape cartridge as set forth in claim 23, wherein the inner peripheral surfaces of each tape reel are bevelled, the bevel angle of the inner peripheral surface nearest to said housing wall being less than that of the other inner peripheral surface with reference to the axis of rotation of the tape reel.

31. A tape cartridge as set forth in claim 30, wherein one of the tape reels has a number of spaced teeth on the inner periphery thereof adjacent to the corresponding other inner peripheral surface, each tooth having a pair of relatively convergent sides extending axially of the tape reel.

32. A spindle for mounting a tape reel on a tape transport comprising: a rotor having a central axis and a circular outer periphery and provided with a number of recesses extending thereinto from said outer periphery; a shaft secured to the rotor for rotating the same about its central axis; a cylindrical detent in each recess, respectively, each detent being shiftably mounted within its respective recess and movable into an operative position with an end portion thereof projecting outwardly from said outer periphery, each detent forming an acute angle with said outer periphery, whereby end portions can be coupled with inner peripheral teeth on a tape reel; and means within each recess, respectively, for yieldably biasing the corresponding detent into said operative position.

33. A spindle for mounting a tape reel on a tape transport comprising: a rotor having a central axis and a circular outer periphery and provided with a number of recesses extending thereinto from said outer periphery; a shaft secured to the rotor for rotating the same about its central axis; a detent in each recess, respectively, each detent being shiftably mounted within its respective recess and movable into an operative position with an end portion thereof projecting outwardly from said outer periphery, whereby end portions can be coupled with inner peripheral teeth on a tape reel; and means within each recess, respectively, for yieldably biasing the corresponding detent into said operative position, each recess having a first portion extending at an acute angle with respect to the outer periphery of the rotor, and a second portion extending transversely of the first portion, the corresponding detent being in the first recess portion and said bias means being in the second recess portion.

34. A spindle for mounting a tape reel on a tape transport comprising: a rotor having a central axis and a circular outer periphery and provided with a number of recesses extending thereinto from said outer periphery; a shaft secured to the rotor for rotating the same about its central axis; a detent in each recess, respectively, each detent being shiftably mounted within its respective recess and movable into an operative position with an end portion thereof projecting outwardly from said outer periphery, whereby end portions can be coupled with inner peripheral teeth on a tape reel; and means within each recess, respectively, for yieldably biasing the corresponding detent into said operative position, each detent normally engaging the rotor at the inner end of the corresponding recess, the latter having a configuration permitting the detent to pivot about said inner end of the recess and away from said outer periphery when an inwardly directed force is exerted on the detent.

35. A spindle for mounting a tape reel on a tape transport comprising: a rotor having a central axis and a circular outer periphery and provided with a number of recesses extending thereinto from said outer periphery; a shaft secured to the rotor for rotating the same about its central axis; a cylindrical detent in each recess, respectively, each detent being shiftably mounted within its respective recess and movable into an operative position with an end portion thereof projecting outwardly from said outer periphery, whereby end portions can be coupled with inner peripheral teeth on a tape reel; and individual means within each recess for yieldably biasing the corresponding detent into said operative position, each recess having a first portion for receiving its respective detent and a second portion extending transversely to the first portion for receiving its respective bias means, the first portion having a length sufficient to permit the inner end portion of the detent to engage the rotor at the inner end of the first portion and to cause the outer end portion of the detent to project outwardly from said rotor beyond said outer periphery, each bias means being operable to urge its respective detent against the rotor at the side of its respective first recess portion.

36. A spindle as set forth in claim 35, wherein each bias means includes a coil spring in said second recess portion.

37. A spindle as set forth in claim 35, wherein the inner end face of each detent engages the rotor at the inner end of the corresponding first recess portion, the latter having a width greater than the width of the detent to permit the latter to pivot about said inner end of the first recess portion and toward said second recess portion against the bias force of said bias means when an inwardly directed force is exerted on the detent.

38. A spindle for mounting a tape reel on a tape transport comprising: a shaft; a rotor secured to the shaft and adapted to be inserted into the hub of a tape reel, said rotor having an outer periphery and an end face provided with a number of spaced recesses therein, each recess having an opening at said outer periphery; a detent for each recess, respectively, each detent having a cylindrical outer surface and being shiftably received within its corresponding recess and normally being in an operative position with an end portion thereof extending outwardly from its recess through the corresponding opening and beyond said outer periphery, whereby the longitudinal axis of the detent forms an acute angle with the outer periphery of the rotor and the end portion is disposed for engaging the inner periphery of the tape reel hub; coil spring means within each recess, respectively, for biasing the corresponding detent into said operative position thereof, each coil spring means engaging the cylindrical surface of its respective detent; and means coupled with said rotor for holding the detents within corresponding recesses.

39. A spindle for mounting a tape reel on a tape transport comprising: a shaft; a rotor secured to the shaft and adapted to be inserted into the hub of a tape reel, said rotor having an outer periphery and an end face provided with a number of spaced recesses therein, each recess having an opening at said outer periphery; a detent for each recess, respectively, each detent being shiftably received within the corresponding recess and normally being in an operative position with an end portion thereof extending outwardly from its recess through the corresponding opening and beyond said outer periphery, whereby the end portion is disposed for engaging the inner periphery of the tape reel hub; means within each recess, respectively, for biasing the corresponding detent into said operative position thereof; and a cap removably mounted on said end face of the rotor for closing the recesses to retain the detents therewithin.

40. A spindle construction for a tape transport comprising: a pair of shafts, one of the shafts being tubular, the other shaft being concentric to and received within said one shaft for rotation relative thereto; means coupled with each shaft, respectively, for mounting the same for rotation, each shaft having a rotor thereon for insertion into a respective tape reel of a tape cartridge, one of the rotors being axially spaced from the other rotor, each rotor having a cylindrical outer surface and a set of detent means on each rotor, respectively, for coupling the same to a respective tape reel, the set of detent means for each rotor having spaced portions yieldably extending outwardly from the outer surface thereof and movable inwardly of the rotor as the latter is inserted in a respective tape reel, each rotor having a set of recesses therein with each recess having an opening at the corresponding outer surface, said sets of detent means including individual detents for each recess, and an individual spring for biasing each detent partially out of its recess through the corresponding opening.

41. In a video reproducer and/or recorder of the type that includes a base plate, the combination of a cartridge having axially aligned reels, each reel having an inner annular saw-tooth formation, and a reel driving mechanism comprising:

- a pair of coaxial rotors mounted relative to said base plate;
- an inner shaft for driving the forward one of said rotors in one direction;
- an outer hollow shaft for driving the rear one of said rotors in the opposite direction;
- the forward rotor being of smaller outside diameter than the rear rotor,
- a first set of yieldably biased detents around the periphery of the forward rotor for engaging the toothed formation of one of said reels; and
- a second set of yieldably biased detents around the periphery of the rear rotor for engaging the toothed formation of the other of said reels.

42. The combination according to claim 41 wherein each of the annular toothed formations is disposed outboard of an annular protuberance formed internally of its respective reel so that as the rotors penetrate the reels the detents are yieldably contracted and then expand to lock the reels into axial engagement with the rotors.

43. The combination according to claim 42 wherein each of said protuberances is formed in section with a gradual converging ramp followed by a sharp diverging bevel.

44. The combination according to claim 43 wherein each set of yieldably biased detents comprises a cylindrical element seated generally within its respective periphery and formed to be biased into a tooth and a compression spring seated to thrust the cylindrical member toward said tooth, the spring being oriented diagonally outwardly and in the direction of trail and the element being oriented diagonally outwardly and in the direction of lead, so far as the respective rotor is concerned.

* * * * *